United States Patent [19]
Burges

[11] Patent Number: 6,112,195
[45] Date of Patent: *Aug. 29, 2000

[54] ELIMINATING INVARIANCES BY PREPROCESSING FOR KERNEL-BASED METHODS

[75] Inventor: Christopher John Burges, Freehold, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/825,287

[22] Filed: Mar. 27, 1997

[51] Int. Cl.[7] .............................. G06F 1/035; G06F 5/00
[52] U.S. Cl. .............................................................. 706/20
[58] Field of Search ...................................... 382/159, 181, 382/276; 706/20

[56] References Cited

U.S. PATENT DOCUMENTS

| | | | |
|---|---|---|---|
| 4,838,644 | 6/1989 | Ochoa et al. ................................ | 359/9 |
| 5,054,094 | 10/1991 | Barski ...................................... | 382/192 |
| 5,263,107 | 11/1993 | Ueda et al. ............................. | 382/157 |
| 5,729,662 | 3/1998 | Rozmus ................................... | 706/20 |
| 5,926,568 | 7/1999 | Cheney et al. .......................... | 382/217 |
| 5,950,146 | 9/1999 | Vapnik .................................... | 702/153 |
| 5,956,427 | 9/1999 | Greenspan et al. ..................... | 382/240 |
| 5,969,524 | 10/1999 | Pierpaoli et al. ........................ | 324/307 |

OTHER PUBLICATIONS

Gilbert Strang, Linear Algebra and Its Applications, Third edition 341–42, 1988.
Microsoft Press, Computer Dictionary, Third Edition, 272, 375, 1997.
R.P. Lippmann, "Pattern Classification Using Neural Networks," IEEE Communications Magazine, vol. 27 (11), pp. 47–64, Nov. 1989.

A. Khotanzad and J.-H. Lu, "Classification of Invariant Image Representations Using a Neural Network," IEEE Trans. on Accoustics, Speech, and Signal Processing, vol. 38 (6), pp. 1028–1038, Jun. 1990.

J.I. Minnix, et al., Multistaged Self–Organizing Neural Network with Biologically Inspired Preprocessing Features for Rotation and Scale Invariant Pattern Recognition, vol. 3, pp. 1605–1610, Oct. 1991.

S.J. Perantonis and P.J.G. Lisboa, "Translation, Rotation, and Scale Invariant Pattern Recognition by High–Order Neural Networks and Moment Classifiers," IEEE Trans. on Neural Networks, vol. 3(2), pp. 241–251, Mar. 1992.

C. Yuceer and K. Oflazer, "A Rotation, Scaling and Translation Invariant Pattern Classification System," Proc. 11th IAPR Int'l Conf. on Pattern Recognition, vol. II, pp. 422–425, Sep. 1992.

J.A. Starzyk and S. Chai, "Vector Contour Representation for Object Recognition in Neural Networks," 1992 IEEE Int'l Conf. on Systems, Man and Cybernetics, vol. 1, pp. 399–404, Oct. 1992.

(List continued on next page.)

*Primary Examiner*—Tariq R. Hafiz
*Assistant Examiner*—Michael Pender
*Attorney, Agent, or Firm*—Joseph J. Opalach

[57] ABSTRACT

A kernel-based method and apparatus includes a preprocessor, which operates on an input data in such a way as to provide invariance under some symmetry transformation.

14 Claims, 2 Drawing Sheets

OTHER PUBLICATIONS

Y. Onodera, et al., "Translation and Rotation–Invariant Pattern Recognition Method Using Neural Network with Back–Propagation," Communications on the Move, ICCS/ISITA '92, vol. 2, pp. 548–552, Nov. 1992.

P.Y. Simard, et al., "Memory–Based Character Recognition Using a Transformation Invariant Metric," Proc. 12th Int'l Conf. on Pattern Recognition, pp. 262–267, Oct. 1994.

Q.–S. Chen, et al., "Symmetric Phase–Only Matched Filtering of Fourier–Mellin Transforms for Image Registration and Recognition," IEEE Trans. on Pattern Analysis and Machine Intelligence, vol. 16(12), pp. 1156–1168, Dec. 1994.

J. Tanomaru and A. Inubushi, "A Compact Representation of Binary Patterns for Invarinat Recognition," 1995 IEEE Int'l Conf. on Systems, Man and Cybernetics, vol. 2, pp. 1550–1555, Oct. 1995.

E.A. Heredia and G.R. Arce, "Piecewise Polynomial Kernel Networks," Proc. Int'l. Conf. on Neural Networks, pp. 1558–1563, Jun. 1996.

C. J. C. Burges et al., "Improving the Accuracy and speed of support vector machines", Advances in Neural Information Processing Systems 9. Proceedings of the 1996 Conference, Advances in Neural Information Processing Systems 9, Proceedings of the 1996 Conference, Denver, CO, USA, Dec. 2–5, 1996, pp. 375–381, XP002088166, ISBN 0–262–10065–7, 1997, London, UK, MIT Press, UK, *the whole document* particularly relevant if taken alone.

P. Y. Simard et al., "Memory–Based Character Recognition Using a Transformation Invariant Metric", Proceedings of the IAPR International Conference on Pattern Recognition, Jerusalem, Oct. 9–13, 1994 Conference B: Pattern Recognition and Neural Networks, vol. 2, No. Conf. 12, Oct. 9, 1994, pp. 262–267, XP000509894, Institute of Electrical and Electronics Engineers, *Abstract* technological background.

Hidefumi Sawai, "Axially Symmetric Neural Network Architecture for Rotation–Invariant Patter Recognition", International Conference on Neural Networks/World Congress on Computational Intelliges, Orlando, Jun. 27–19, 1994, vol.7, Jun. 27, 1994, pp. 4253–4258, XP000531357, Institute of Electrical and Electronics Engineers, *Abstract*.

Mas J. et al: Invariant Perception for Symmetry Related Patterns, International Joint Conference on Neural Networks (IJCNN), Washington, Jun. 19–22, 1989., vol. 1, Jun. 19, 1989, pp. 85–89, XP000088251, Institute of Electrical and Electronic Engineers—*Abstract*.

"Extracting Support Data For A Given Task," B. Scholkopf, et al., Eds. Proceedings, International Conference on Knowledge Discovery & Data Mining, AAAI Press, Menlo Park, CA 1995.

"Incorporating Invariances in Support Vector Learning Machines", B. Schoklopf et al., Proceedings ICANN'96—International Conference on Artificial Neural Networks, Springer Verlag, Berlin 1996.

ELIMINATING INVARIANCES BY PREPROCESSING FOR KERNEL-BASED METHODS

FIELD OF THE INVENTION

This invention relates generally to a class of problems falling within what is known as "kernel-based methods."

BACKGROUND OF THE INVENTION

Pattern recognition, regression estimates, density estimation are a few examples of a class of problems that are analyzed using kernel-based methods. The latter are illustratively described herein in the context of pattern recognition. However, it should be noted that the inventive concept (described below) is not limited to pattern recognition and is applicable to kernel-based methods in general (of which support-vector-machines are an example).

In pattern recognition, it is known in the art to use a recognizer having a support-vector-machine (SVM) architecture. The SVM is viewed as mapping an input image onto a decision plane. The output of the SVM is typically a numerical result, the value of which is associated with whether, or not, the input image has been recognized as a particular type of image.

As a very general example, consider a 16 pixel by 16 pixel image of a tree. In this context, an SVM recognition system is first "trained" with a set of known images of a tree. For example, the SVM system could be trained on 1000 different tree images, each image represented by 256 pixels. Subsequently, during operation, or testing, the SVM system classifies input images using the training data generated from the 1000 known tree images. The SVM system indicates classification of an input image as the desired tree if, e.g., the output, or result, of the SVM is a positive number.

Unfortunately, in the above example, the recognizer may have to deal not only with a particular type of tree image, but also with translates of that tree image. For example, a tree image that is shifted in the vertical direction—but is still the same tree. To some extent this kind of translation can be dealt with by using tree images that represent such a vertical shift. However, the SVM system is still trained to predefined images, it's just that some of these predefined images are used to represent translations of the image (as opposed to, e.g., different types of trees).

SUMMARY OF THE INVENTION

A kernel-based method and apparatus includes a preprocessor, which operates on an input data in such a way as to provide invariance under some symmetry transformation.

In an embodiment of the invention, a pattern recognizer includes a preprocessor and a support vector machine (SVM). The latter is trained to recognize a particular set of images. The preprocessor operates on an input image in such a way as to provide local translation invariance. In particular, the preprocessor maps a particular input image, and its translate, to two points in the decision plane of the SVM, whose difference is independent of the original data. As a result, the recognizer has built-in local invariance and does not require training the SVM to translated versions of the images.

In accordance with a feature of the invention, the size of the preprocessed image is less than the size of the original image. In other words, the SVM operates on less data than required in the prior art. Thus, the inventive concept enables the SVM to operate more efficiently in terms of, e.g., memory size, and training time, yet classify more patterns than in the prior art for a given-size SVM.

DETAILED DESCRIPTION

Before describing an illustrative embodiment of the invention, the inventive concept itself is described. (Other than the inventive concept, it is assumed that the reader is familiar with mathematical notation used to generally represent kernel-based methods as known in the art.) Also, the inventive concept is illustratively described in the context of pattern recognition. However, the inventive concept is applicable to all kernel-based methods. Some examples of the classes of problems covered by kernel-based methods are: regression estimates, density estimation, etc.

Introduction

As used herein, "kernel-based methods" means methods which approximate an unknown function $G(x)$ by $F(x)$, where $F(x)$ has the form:

$$F(x) = \sum_q a_q K(p_q, x) + b, \; a_q, b \in R^1, x \in R^n, p_q \in R^{n'} \quad (1)$$

and where $a_q$, $b$, and $P_q$, are parameters that are to be determined from empirical data by a training procedure, and K is a kernel function, whose form is usually chosen in advance. Additive models (e.g., see T. J. Hastie and R. J. Tibshirani, *Generalized Additive Models*, Chapman and Hall, 1st edition, 1990), Radial Basis Functions (e.g., see M. J. D. Powell, Radial basis functions for multivariable interpolation: A review, In *Algorithms for Approximation*, J. C. Mason and M. G. Cox (Eds.), pages 143–167, Oxford Clarendon Press, 1987; F. Girosi, M. Jones, and T. Poggio, Regularization theory and neural networks architectures, *Neural Computation*, 7(2):219–269, 1995; and C. M. Bishop, *Neural Networks for Pattern Recognition*, Clarendon Press, Oxford, 1995; and Support Vector Machines (e.g., see C. Cortes and V. Vapnik, Support vector networks, *Machine Learning*, 20:273–297, 1995; and V. Vapnik, *The Nature of Statistical Learning Theory*, Springer Verlag, New York 1995) are examples of such methods. Pattern recognition, regression estimation, density estimation, and operator inversion are examples of problems tackled with these approaches (e.g., see A. Smola, V. Vapnik, S. Golowich, Support vector method for function approximation, regression estimation, and signal processing, *Advances in Neural Information Processing Systems*, 9, 1996). Thus for example in the density estimation case, x is a point (in a vector space) at which the probability density is required, and $F(x)$ is the approximation to that density; for the classification case, x is a test pattern to be classified, and $sgn(F(x))$ gives the corresponding label. Similarly, for pattern recognition, an SVM is first trained to recognize a target image, as described earlier. During operation, or testing, the SVM indicates classification of input data (representing an input image) according to equation (1). If the SVM classifies the input data as the target image, F(x) is, e.g., equal to a positive number.

Clearly this approach is general. However the generality brings with it the problem of model selection, i.e., which family of functions to choose for the kernels. While some work has been done on this (e.g., for the support vector pattern recognition case see B. Schölkopf, C. Burges, and V. Vapnik, Extracting support data for a given task, In U. M. Fayyad and R. Uthurusamy, editors, *Proceedings, First International Conference on Knowledge Discovery & Data Mining,* AAAI Press, Menlo Park, Calif., 1995), it remains a significant unsolved problem.

In accordance with the inventive concept, the description below explores how imposing constraints arising from domain knowledge can restrict the family of kernels. In the following, bold face is used for vector and matrix quantities, and light face for their components.

Incorporating Local Invariances

This section describes the general approach of the inventive concept. The object is to find those kernels in equation (1) such that, if any given test point x is transformed under a known symmetry of the problem, the result F is unchanged.

Given two test points x and y, equation (1) defines an affine structure with distance function:

$$\rho(x,y) = \sum_q a_q (K(p_q, x) - K(p_q, y)) \quad (2)$$

(An affine structure is a mathematical term for a type of vector space as known in the art). For example, $\rho$ can be thought of as counting contours between patterns in the pattern recognition case.

In accordance with the inventive concept, it is preferable to choose a class of kernels so that $\rho(x, y)$ is close to zero if y is a transform of x along some symmetry direction. If y=x+dx, then $$d\rho = \sum_{q,i} a_q dx^i \partial_i K(p_q, x) \quad (3)$$

where we define $\partial_i \equiv \partial/\partial x_i$. Requiring that this be zero for all $a_q$ gives:

$$\sum_i dx^i \partial_i K(p_q, x) = 0 \quad (4)$$

Note that for a particular problem, for which the $a_q$ are known to satisfy certain constraints, equation (4) may be more restrictive than is necessary to ensure that $d\rho=0$, but in this work no such assumption about $a_q$ is made.

We will consider transformations that take the general form:

$$x'_i = x_i + \alpha f_i(x), \alpha \in R^1 \quad (5)$$

for which, in the limit as $\alpha \to 0$, equation (4) takes the form:

$$\sum_i f_i(x) \partial_i K(p_q, x) \equiv OK(p_q, x) = 0 \quad (6)$$

which defines the operator $\mathcal{O}$. From now on the parameter vector $p_q$ in K is not explicitly written.

Operator Invariance for the Linear Case

The following two simple theorems are proven for the case in which the transformation represented by equation (5) is both linear and invertible.

Theorem: For linear, invertible transformations (equation (5)), the operator $\mathcal{O}$ is itself invariant under the transformation.

Proof: Let U denote the unit matrix, "T" denote transpose, and $\partial$ denote the vector with components $\partial_i \equiv \partial/\partial x_i$. Denote the transformation by $$x' = (U + \alpha M)x. \quad (7)$$

Then the operator $\mathcal{O}$ in equation (6) is given by $$\mathcal{O} = x^T M^T \partial$$

and $$O' = x'^T M^T \partial' = \sum_{ijk} M_{ij} (U + \alpha M)_{jk} x_k (U + \alpha M)^{-1}_{mi} \partial_m \quad (8)$$

$$= x^T M^T \partial = 0$$

Theorem: For linear, invertible transformations (equation (5)), denoting the argument of K( ) by its components $x_i$, if $K(x_i)$ satisfies equation (6), then so does $K(x_i + \alpha f_i(x))$, for finite $\alpha$.

Proof:

$$\mathcal{O} K(x_i) = 0 = \mathcal{O}' K(x_i + \alpha f_i(x)) = \mathcal{O} K(x_i + \alpha f_i(x)) \quad (9)$$

since $\mathcal{O}$ is an invariant by the above theorem.

Multiple Symmetries

For a set of M symmetries, there will be M simultaneous equations of the form of equation (3), which will result in a system of M equations of the form $$\mathcal{O}_m u(x_0, \ldots, x_{n-1}) = 0, m = 1, \ldots, M \quad (10)$$

where $\{\mathcal{O}_m\}$ is a set of linear differential operators, each of which takes the general form $$O_m = \sum_i f_{mi}(x) \partial_i \quad (11)$$

analogous to equation (6).

The questions arise: when do non-trivial integrals of equation (10) exist, and how many such independent integrals are there? Following *"Techniques in Partial Differential Equations,"* Clive R. Chester, McGraw-Hill, 1971, the following definitions are made:

Definition: A system of operators $\{\mathcal{O}_i\}$ is called complete if all commutators take the form $$[O_i, O_j] = \sum_k c_{ijk} O_k \quad c_{ijk} \in R^1 \quad (12)$$

(Note that, from their definition, the $c_{ijk}$ satisfy the known Jacobi identity, so they are in fact the structure constants of some Lie algebra (e.g., see Peter J. Olver, *Applications of Lie Groups to Differential Equations,* Springer-verlag, 1986, New York).)

Definition: A system of equations (10) is called complete if the corresponding operators form a complete set.

Theorem: Any complete system of r<n independent equations, of the form of equation (10), has exactly n−r independent integrals.

Thus, non-trivial integrals will only exist if the number of operators r in the complete set is less than n, and if so, there will be n−r of them. In the latter case, the general solution of the system of equations (10) has the form $$F(u_0(x_0, \ldots, x_{n-1}), \ldots, u_{n-r-1}(x_0, \ldots, x_{n-1})) \quad (13)$$

where $u_0, \ldots, u_{n-r-1}$ are the set of independent integrals of the system of equations (10) and F is any $C^1$ (i.e., differentiable) function (for reasons that will become clear below, the vector components are indexed starting with index 0). Now, the recipe for finding the complete set is clear: one generates new operators by computing commutators of the existing set of operators, and stops when either one has found a complete set, or when r>n.

Note that this gives us capacity control exactly where we want it. For example, for a set of commuting symmetries (i.e., all $C_{ijk}$ vanish), the number of degrees of freedom in the problem is reduced by exactly the number of symmetries imposed.

Thus, and in accordance with the inventive concept, generating an invariant kernel amounts to preprocessing the data, and then using any existing kernel. By imposing one symmetry only one degree of freedom is lost (e.g., in a pattern recognition problem, a 256 pixel image becomes a 255 pixel, preprocessed image).

Building Locally Invariant Kernels

Given the general solution to the system of equations (10), construction of a kernel function remains. It may not be possible to simply substitute any F in equation (13) for K in equation (1), since the set of functions K may have further constraints placed on them by the particular method being used, for example, their dependence on the parameter set $p_q$. However, such constraints are easily satisfied, since the only requirement on the F's is that they are differentiable.

For example, for support vectors machines, the kernels take the form $K(s_q, x)$, where the $s_q$ are the support vectors (which have dimension equal to that of x). There are two constraints on the form the kernels may take: they must be symmetric, $K(x, y) = K(y,x) \; \forall x, y \in R^n$, and they must satisfy Mercer's positivity constraint (e.g., see, B. E. Boser, I. M. Guyon, and V. Vapnik, Extracting support data for a given task, in U. M. Fayyad and R. Uthurusame, editors, *Proceedings, First International Conference on Knowledge Discovery & Data Mining*, AAAI Press, Menlo Park, Calif., 1995; and R. Courant and D. Hilbert, *Methods of Mathematical Physics*, Interscience, 1953) namely $$\int K(x,y)g(x)g(y)dxdy > 0 \; \forall g \in L^2, \int (g(x))^2 dx > 0 \quad (14)$$

The data are points in the vector space $R^n$. Below, this space is referred to as I for "input." (Call the vector space for the preprocessed data P for "preprocessed."). Now, suppose that some number of symmetries have been imposed, resulting in a complete set of size r<n, so that the number of independent integrals (and hence, the dimension of P) is n−r. Thus, the solutions have the general form of equation (13) above. We can then, in accordance with the principles of the invention, simply choose F to have the form of a kernel function which is known to satisfy the constraints, but which takes n−r arguments instead of n. As a specific example, we might take degree p polynomial kernels, for which the F will have the form $$F(u,v)=(u \cdot v+1)^p, u,v \in R^{n-r} \quad (15)$$

Since such kernels are symmetric and satisfy Mercer's condition, all the desired constraints are satisfied. What was a polynomial support vector machine has, in accordance with the inventive concept, become a polynomial support vector machine acting on preprocessed data. However, the functional form that the overall kernels take, when considered as functions of the input data x, will no longer in general be polynomial.

An Example: Vertical Translation Invariance

In this section, a detailed example is provided in the context of pattern recognition using an illustrative example of vertical translation invariance with cyclic boundary conditions. A cyclic boundary condition simply means that each image wraps around, e.g., if a column of pixels is "shifted up" one pixel, the top pixel "wraps-around" to the bottom.

Consider an image of N rows and one column. Cyclic boundary conditions are imposed to simplify the analysis. Here, the local invariance is a shift of up to one pixel, i.e., α is between zero and one (larger shifts could be handled by extending the analysis below). In this case the transformations take the form:

$$x'_i=(1-\alpha)x_i+\alpha x_{(i+1)}, i=0, \ldots, N-1 \quad (16)$$

where the pixel values $x_i$ are considered to be components of a vector x. (The pixel values are image dependent, e.g., a binary image pixel has a value of one (dark) and zero (light). Note that here and below the following convention are adopted: all indices i, j, k, and sub-expressions involving them, are to be taken modulo n.

Note that solving the N by 1 problem amounts to solving the general N by M problem. An N by M image is converted to an NM by 1 image by pasting the top of each column of pixels to the bottom of the previous column. To make the cyclic boundary conditions a realistic assumption, a border of one blank pixel is added to the top and bottom of each image.

The Relation with Group Action

We start by using the example of vertical translation invariance to make some general observations regarding the rather subtle relation of the transformations (5) to a group action. (As known in the art, if a group action is proven then other mathematical transformations apply.) Since pixels are an approximation to a continuous function which can be considered as a representation of the group of translations, let us first make the connection between pixels and the continuous case. Let I(z) represent the original image field for which the N-pixel column is an approximation. Thus $$x_i=I(i), i=0, \ldots, N-1 \quad (17)$$

Translating by a distance α means replacing I(z) by I'(z)=I(z−α). The new pixel values become $$x'_i=I'(i)=I(i-\alpha) \approx I(i)-\alpha(\partial_z I)(i) \quad (18)$$

Approximating $(\partial_x I)(i)$ by I(i)−I(i−1) then gives equation (16).

The binning of the data into a vector has the consequence that equation (5), for finite α, is not necessarily a group action, although it does constitute the desired transformation, even for finite α. This point is illustrated by the following simple specific case, namely vertical translation invariance for a column of three pixels, whose values are labeled by x, y, z. Then equation (16) for x becomes:

$$x'=g_\alpha x \equiv x(1-\alpha)+\alpha y \quad (19)$$

where $g_\alpha$ is the operator instantiating the transformation. Then $$(g_\beta {}^\circ g_\alpha)x = x(1-\alpha)(1-\beta) + y(\alpha+\beta-2\alpha\beta) + z\alpha\beta \qquad (20)$$

so there exists no $\gamma$ such that $g_\gamma = g_\beta {}^\circ g_\alpha$. However, to first order in $\alpha$, $\beta$, the above transformations do form a group, with $g_\alpha^{-1} = g_{-\alpha}$. Thus, the action may be viewed as of a group only for infinitesimal values of the parameters (e.g., see the above-mentioned reference by Peter J. Olver). Despite this fact, the transformation represented by equation (19) does constitute a translation of the binned data for finite values of $\alpha$ (in fact for any ($\alpha \in [0,1]$).

But if the action is a group action for infinitesimal values of the parameters, then the corresponding differential operators are necessarily generators for some Lie group. Indeed, one may explicitly compute the exponentiation of the generator corresponding to equation (16) acting on a particular point, for example:

$$e^{[\alpha((y-x)\partial x + (z-y)\partial y + (x-z)\partial z]}x = x + (y-x)h_1 + (x-2y+z)h_2 + \qquad (21)$$
$$(y-z)h_3 + (x+y-2z)h_4 + (x-z)h_5 + (-2x+y+z)h_6$$

where the $h_i$ are functions of $\alpha$ alone. This only corresponds to the transformation (equation (19)) to first order in $\alpha$. To summarize, the transformation (equation (19)) coincides with that of a Lie group only for infinitesimal values of the parameters; for finite values, it is no longer a group, but it is still the desired transformation.

A Simple Example: The 4 Pixel Stack

To show how things work, the following is a simple example of an image which consists of a stack of 4 pixels. Equation (6) becomes:

$$\{((x_1-x_0)\partial_{x0} + (x_2-x_1)\partial_{x1} + (x_3-x_2)\partial_{x2} + (x_0-x_3)\partial_{x3}\}u(x) = 0 \qquad (22)$$

The general solution to this is:

$$f(x_0, x_1, x_2, x_3) = F(u_0, u_1, u_2) \qquad (23)$$

where $$u_0 = x_0 + x_1 + x_2 + x_3 \qquad (24)$$

$$u_1 = \ln\left(\frac{x_0 - x_1 + x_2 - x_3}{(x_0 - x_2)^2 + (x_3 - x_1)^2}\right) \qquad (25)$$

$$u_2 = \arctan\left(\frac{x_3 - x_1}{x_0 - x_2}\right) + \frac{1}{2}\ln((x_0 - x_2)^2 + (x_3 - x_1)^2) \qquad (26)$$

and where F is any $C^1$.

This solution has two properties to which attention should be drawn.

First, $u_0$, and only $u_0$, is "globally" invariant (invariant for any of the allowed values of $\alpha$ in equation (16).

Second, all three independent integrals have a property referred to herein as "additive invariance."

Additive Invariance

Below, transformed coordinates are denoted with a prime:

$$x_i' \equiv x_i(1-\alpha) + x_{i+1}\alpha, \ i = 0, \ldots, 3. \qquad (27)$$

Definition: An "additive invariant" integral is defined to be one that has the property:

$$u_j(x') = u_j(x) + f_j(\alpha), \ j = 0, \ldots, 2 \qquad (28)$$

for some functions $f_j$.

Denote by $\Phi$ the mapping which takes points in I to points in P. Additive invariance is a desirable property of the mapping $\Phi$. It means that two points in I which are related by a vertical translation, map into two points in P, whose difference is independent of the original data, and depends only on the transformation parameter. Thus, and in accordance with the principles of the invention, to distinguish two translated images from each other, the learning machine has only to learn a vector valued function of one parameter, where that parameter is independent of the original data (i.e. the pixel values of the un-translated image). For example, as described above, by imposing (upwards) vertical translation invariance on a 4 pixel image, the preprocessed image has one less pixel. This, in effect, reduces the number of degrees of freedom in the problem. Thus, this can be viewed as a form of capacity control, where the number of variables decreases in a controlled way as the number of imposed symmetries increases.

Note also that the original data does not have this property: for pixel data, the difference between two translated images depends on the original image.

Note that the solution of a partial differential equation (PDE) has a large degree of arbitrariness in the independent integrals found. For the above example, the $u_j^2$ could have equally been taken as the integrals instead of the $u_j$. The former do not have the additive invariance property. Thus for a general problem, one can only hope to find particular additive invariant integrals, rather than prove that all integrals will be additive invariant.

Finally, it should be noted that $u_0$ and $u_1$ above are also solutions of the corresponding differential equations for vertical translation invariance in the opposite direction. Since the two operators commute there will be a total of two independent integrals. Consequently, the full solution is found, and this solution is clearly additive invariant.

The example given in this Section raises the following questions for the case of arbitrarily sized images: First, can the general solution be obtained? (After all, solving a PDE with an arbitrary number of dimensions could turn out to be analytically intractable). Second, in general, is there only one globally invariant independent integral analogous to $u_0$ above? If so, it will make looking for additive invariant solutions of considerable interest. Finally, can one find those special integrals which are also additive invariant? Answers to these questions are in the next Section.

The N-pixel Stack

As mentioned above, in order to answer the above questions for an arbitrarily sized image, we only need consider the case of an N-pixel stack. The PDE analogous to equation (22) is $$\sum_{i=0}^{n-1} \{(x_{i+1} - x_i)\partial_{xi}\}u(x) = 0 \qquad (29)$$

A No-Go Theorem

Consider the following:

Theorem: The general invariant solution of equation (29) has the form $F(\Sigma_i x_i)$, where $F \in C^1$.

Proof: As used herein, the notation PRM denotes cyclic permutation of the indices. By definition, an invariant solution must satisfy $\partial_\alpha u(x') = 0$, where x' is the linear function of $\alpha$ defined in equation (27). However, $$\partial_\alpha u(x') = (x_2 - x_1)\partial'_1 u(x') + PRM. \quad (30)$$

Here, the notation $\partial_\alpha \equiv \partial/\partial\alpha$ and $\partial'_1 \equiv \partial/\partial x'_1$, etc. is introduced. A set of PDEs that u must satisfy can be generated by expressing the $x_i$ in terms of the $x'_i$. Note first that the transformations (equation (16)) can be written $$x' = Mx, \quad (31)$$

where $$M_{ij} \equiv \delta_{ij}(1-\alpha) + \delta_{i,j-1}\alpha, i,j=0,\ldots,n-1 \quad (32)$$

Note also that $$detM \equiv S = (1-\alpha)^n - (-1)^n\alpha^n \quad (33)$$

One can verify directly, by matrix multiplication, that $$(M^{-1})_{ij} = (1/S)(\alpha-1)^{i-j-1}\alpha^{j-i}(-1)^{n-1} \quad (34)$$

Consequently, $$(-1)^{n-1}S(x_2 - x_1) = (\alpha^{n-1} - (\alpha-1)^{n-1})x'_1 - \sum_{j=2}^n (\alpha-1)^{n-j}\alpha^{j-2}x'_j \quad (35)$$

By using the fact that both M and $M^{-1}$ are cyclic matrices, it is straightforward to show that the expression for $x_{i+1} - x_i$ can be obtained from equation (35) by cycling the $x'_j$ on the right hand side.

Lemma: The coefficient of $\alpha^p$ on the right hand side of equation (35) may be written as $(-1)^{n-p-1}(-x'_1 + x'_{p+2})$.

Proof: The proof is by induction. First, note by inspection that the coefficient of $\alpha^0$ on the right hand side is $(-1)^n x'_1 - (-1)^{n-2} x'_2$. This provides the PDE $$\{(x'_2 - x'_1)\partial'_1 + PRM\}u = 0 \quad (36)$$

Equation (36) can then be substituted in equation (35) to eliminate terms of order 1. Assuming that this elimination scheme works up to order $\alpha^p$, the right hand side of equation (35) becomes $$\{\alpha^{n-1} - (\alpha-1)^{n-1} - (\alpha-1)^{n-2} - \alpha(\alpha-1)^{n-3} - \quad (37)$$

$$\ldots - \alpha^p(\alpha-1)^{n-(2+p)}\}x'_1 - \sum_{j=p+3}^n (\alpha-1)^{n-j}\alpha^{j-2}x'_j \quad (38)$$

Using the identity $$\sum_{i=1}^{p+1} C_i^{n-3-p+i} = C_{p+1}^{n-1} - 1 \quad (39)$$

the coefficient of $\alpha^{p+1}$ in equation (37) is $(-1)^{N-p-2}(-x'_1 + x'_{p+3})$. This completes the proof of the Lemma.

Thus, extracting coefficients of powers of $\alpha$ on the right hand side of equation (35) gives the family of PDEs $$((x_1 - x_0)\partial_0 + PRM)u = 0 \quad (40)$$

$$((x_2 - x_0)\partial_0 + PRM)u = 0 \quad (41)$$

$$\ldots \quad (42)$$

$$((x_{N-1} - x_0)\partial_0 + PRM)u = 0 \quad (43)$$

These are independent equations, since the matrix of coefficients is of rank n−1 for some choices of the $x_i$. Finally, it is straightforward to check that all the operators appearing in equation (40–43) commute, so this set of n−1 PDEs forms a complete set. Thus, it has only one integral solution. By substitution it is easily checked that $u(x) = \Sigma_i x_i$ is a solution; thus the general solution takes the form $F(\Sigma_i x_i)$, where $F \in C^1$. This completes the proof of the theorem.

This theorem demonstrates that one cannot hope to find globally invariant solutions of the equation (29) other than $F(\Sigma_i x_i)$. Thus, one needs to search for "second best" solutions, such as additive invariant ones.

The General Solution

A general solution for the N-pixel stack is now derived. Equation (29) may be viewed as the dot product of the gradient of an unknown function u with a vector field in n dimensions, and to find the general solution one must solve the set of PDE's which describe the characteristic surfaces, which are themselves parameterized by some $t \in R^1$ (e.g., see, E. C. Zachmanoglou, Dale W. Thoe, "*Introduction to Partial Differential Equations with Applications*," Dover, Mineola, N.Y., 1986):

$$\frac{dx}{dt} = Ax \quad (44)$$

where $$A_{ij} = -\delta_{ij} + \delta_{i,j+1} \quad (45)$$

A has determinant zero and eigenvalues $\lambda_k$ given by $$1 + \lambda k = e^{2\pi i k/n}, k=0,\ldots,n-1 \quad (46)$$

Here and for the remainder of this description, symbol i is reserved for the square root of −1. By inspection, eigenvectors z are constructed $$z_{k,j} = e^{2\pi i j k/n}, j, k=0,\ldots,n-1 \quad (47)$$

where the first index k labels the eigenvector, and the second j its components. Let S be the matrix whose columns are the eigenvectors. Then S diagonalizes A:

$$S^{-1}AS = diag(\lambda_i) \quad (48)$$

Note that the following Lemma holds, despite the fact that A is neither symmetric nor hermitian:

Lemma: The inverse of S is given by $(1/n)S^\dagger$ (where † denotes hermitian conjugate).

Proof:

$$(1/n)\sum_j S^\dagger_{mj}S_{jk} = (1/n)\sum_{j=0}^{n-1}(e^{2\pi i(k-m)/n})^j \quad (49)$$

There are two cases: clearly, when k=m, the sum is unity. When k≠m, the sum is $$(1/n)\frac{e^{2\pi i(k-m)} - 1}{e^{2\pi i(k-m)/n} - 1} \quad (50)$$

which, since for k≠m, $e^{2\pi i(k-m)/n} \neq 1$, is zero.

Thus introducing $y \equiv S^{-1}x$, the solutions of equations (44) are given by $$y_o = c_0 \quad (51)$$

$$t = \frac{1}{e^{2\pi i k/n} - 1} \ln\left(\frac{yk}{ck}\right), k = 1, \ldots, n-1 \quad (52)$$

where the $c_k$ are constants of integration. One can then easily show that equations (51) and (52) constitute only n−1 independent equations.

Now, the explicit solution to equation (29) is written for n even (the solution for n odd is similar and not described herein). Again, let F be any $C^1$ function. The general solution is written $$f(x_0, \ldots, x_{n-1}) = F(u_0, \ldots, u_{n-2}) \quad (53)$$

where $$u_0 = \sum_i x_i \quad (54)$$

$$u_{2k-1} = -(1/\phi_t)\arctan(\phi_s/\phi_c) + (1/2)\ln(\phi_c^2 + \phi_s^2) \quad (55)$$

$$u_{2k} = (1/2)\ln(\phi_c^2 + \phi_s^2) + \phi_t \arctan(\phi_s/\phi_c) - \ln T \quad (56)$$

and where k=1, ..., (n/2)−1, and the following is introduced $$\phi_s(n, k, x) \equiv \sum_{j=0}^{n-1} \sin(2\pi k j/n) x_j \quad (57)$$

$$\phi_c(n, k, x) \equiv \sum_{j=0}^{n-1} \cos(2\pi k j/n) x_j \quad (58)$$

$$\phi_t(n, k) \equiv \frac{\sin(2\pi k/n)}{\cos(2\pi k/n) - 1} \quad (59)$$

and $$T \equiv \sum_{j=0}^{n-1} (-1)^j x_j = \phi_c(n, n/2, x) \quad (60)$$

Additive Invariance

It is now shown that all the independent integrals in the above solution have the additive invariance property. Clearly $u_0$ is additive invariant (in fact it is invariant). The $u_k$, k>0 in equation (53) were all obtained by taking real and imaginary parts of linear combinations of equations (52), i.e. of $$t = \frac{1}{e^{2\pi i k/n} - 1} \ln\left\{(1/nc_k) \sum_j e^{-2\pi i k j/n} x_j\right\}, k > 0 \quad (61)$$

Transforming the x according to equation (16) gives the transform of t:

$$t_\alpha = \left(\frac{1}{e^{2\pi i k/n} - 1}\right) \ln(1 - \alpha + \alpha e^{-2\pi i k/n}) + t, k > 0 \quad (62)$$

Thus taking linear combinations of these equations will always give equations which separate into the sum of an α-dependent part and an x-dependent part. Hence all solutions in equations 55 and 56 are additive invariant.

Illustrative Embodiment

As described above, it has been shown that imposing local symmetries for kernel based methods leads to a method in which one first preprocesses the data, and then can apply any of the usual kernels. It has also been demonstrated how the dimension of the preprocessed data is less than that of the original data, depending on how many, and what kind of symmetries are imposed.

For the illustrative example of translation invariance with cyclic boundary conditions, it has been shown that the preprocessed data has the property that the difference of two mapped images, which are translates of each other, is independent of the original data. Since the class of invariant functions is too small to be of much use, this "additive invariance" is an advantageous alternative.

Figure 1:
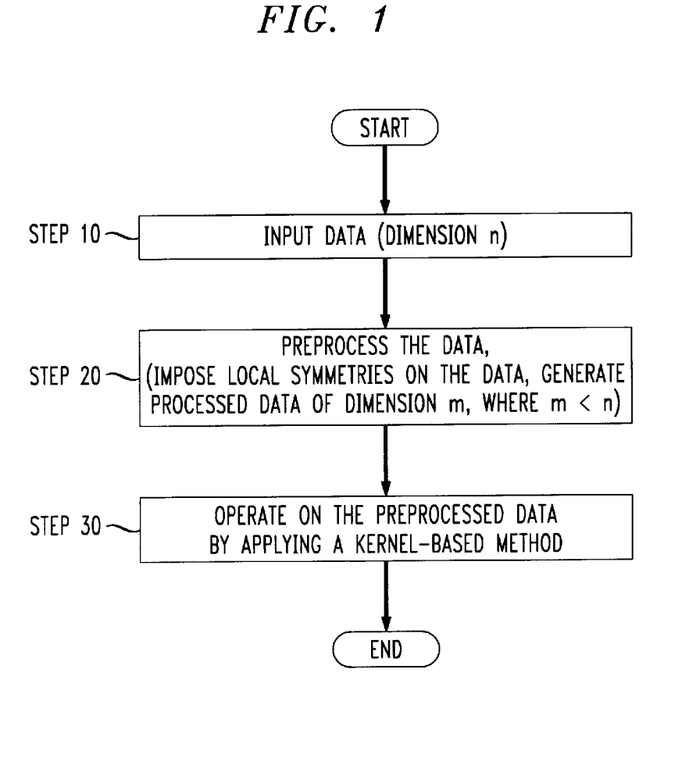
FIG. 1 shows an illustrative flow chart in accordance with the principles of the invention.

Turning now to FIG. 1, an illustrative flow chart embodying the principles of the invention is shown. In step 10, input data of dimension n, is applied to a kernel-based system. In step 20, and in accordance with the inventive concept, the input data is preprocessed to impose k local symmetries. This yields preprocessed data of dimension m, where m<n (and, for example for commuting symmetries m=n−k). Finally in step 30, a kernel-based method operates on the preprocessed data.

Figure 2:
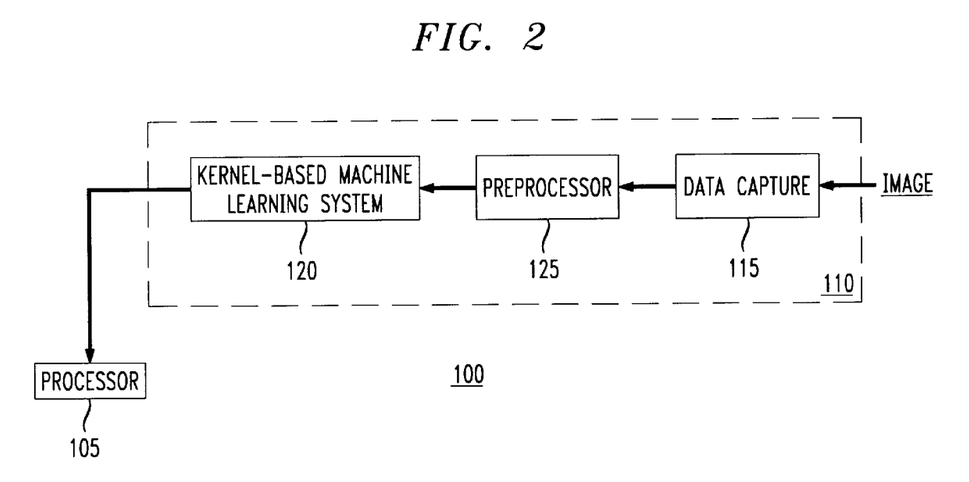
FIG. 2 shows a block diagram of a portion of a recognition system embodying the principles of the invention.

An illustrative embodiment of the inventive concept is shown in FIG. 2 in the context of pattern recognition. Pattern recognition system 100 comprises processor 105 and recognizer 110, which further comprises data capture element 115, preprocessor 125 and kernel-based machine learning system 120. Other than the inventive concept, the elements of FIG. 2 are well-known and will not be described in detail. For example, data input element 115 provides input data for classification to preprocessor 125. One example of data input element 115 is a scanner. In this context, the input data are N pixel representations of an image (not shown). Preprocessor 125 is representative of a stored-program-controlled processor such as a microprocessor with associated memory. Preprocessor 125 operates on the input data in accordance with the principles of the invention. Kernel-based machine learning system 120 is, e.g., a support vector machine as known in the prior art. During operation, or testing, kernel-based machine learning system 120 provides a numerical result representing classification of the input data to processor 105 for subsequent processing. Processor 105 is also representative of a stored-program-controlled processor such as a microprocessor with associated memory. (Note that processor 105 and processor 125 could be physically identical). Processor 105 additionally processes the output signals of recognizer 110, such as, e.g., in an automatic transaction machine (ATM).

In accordance with the inventive concept, preprocessor 125 operates on input data in such a way as to provide local translation invariance. In this example, it is assumed that preprocessor 125 provides vertical translation invariance with cyclic boundary conditions, as described above, for an N pixel stack. Then preprocessor 125 is programmed in accordance with equations (54) to (60).

Figure 3:
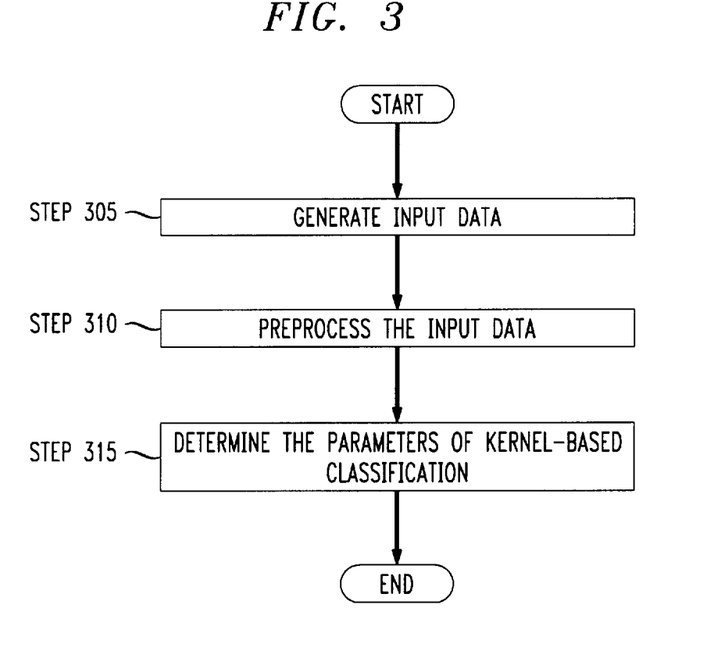
FIG. 3 shows an illustrative method for training the system of FIG. 2 in accordance with the principles of the invention.
Figure 4:
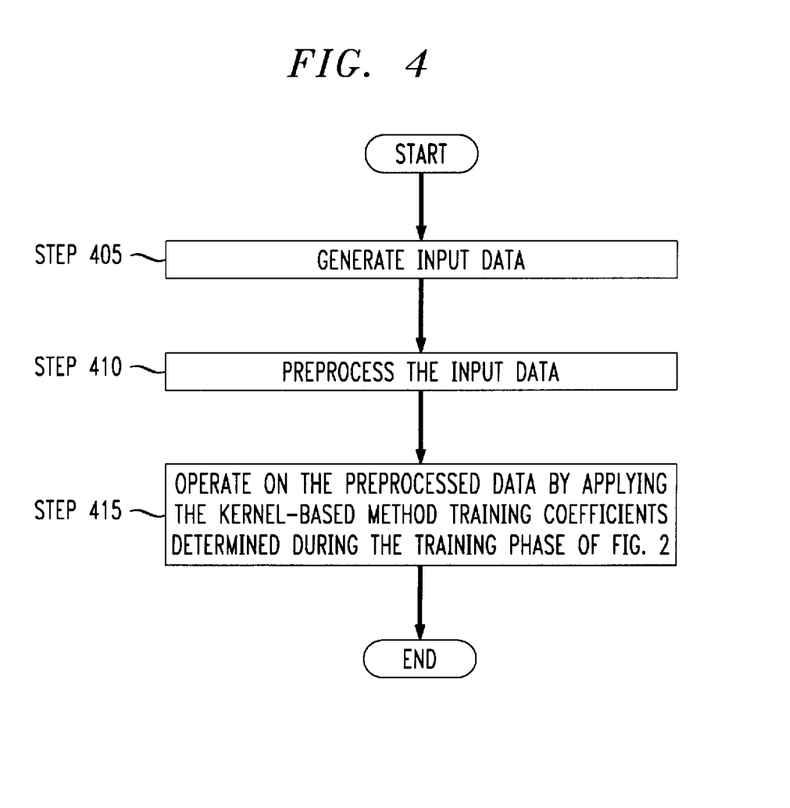
FIG. 4 shown an illustrative method for operating the system of FIG. 2 in accordance with the principles of the invention.

The system shown in FIG. 2 operates in two modes. A training mode and an operating (or test) mode. An illustration of the training mode is represented by the method shown in FIG. 3. An illustration of the test mode is represented by the method shown in FIG. 4.

During training, kernel-based machine learning system 120 is trained on a set of images, M, (not shown). In step 305, of FIG. 3, data capture element 115 generates input data. For example, in the context of images, a set of predefined images is applied to data capture element 115, which provides input data representing each image. The input data for each image is preprocessed by preprocessor 125 for providing preprocessed data in step 310. Kernel-based machine learning system 120 operates on this preprocessed data for determining the parameters of kernel-based classification in step 315. These parameters are illustratively the SVM training coefficients as known in the art.

During operation, or testing, kernel-based machine learning system 120 classifies each image of a set of images, N, (not shown). In step 405, of FIG. 4, data capture element 115 generates input data. For example, in the context of images, a set of images to be classified is applied to data capture element 115, which provides input data representing each image. The input data for each image is preprocessed by preprocessor 125 for providing preprocessed data in step 410. in accordance with the principles of the invention, preprocessor 125 maps a particular input image, and its translates, to points in the decision plane of the SVM, whose differences are independent of the original data. Kernel-based machine learning system 120 operates on this preprocessed data by applying the above-mentioned SVM training coefficients determined during the training phase in step 415. As a result, the recognizer has built-in local invariance and does not require training the SVM to translated versions of the images.

As described above, and in accordance with the principles of the invention, a recognizer has built-in local invariance and does not require training a classifier to translated versions of the images. In addition, the size of the preprocessed image is less than the size of the original image. That is, for each degree of symmetry imposed, there is a loss of one degree of freedom. This is illustrated in the context of the pattern recognition examples above. If vertical symmetry is imposed on a 256 pixel image to provide translation invariance of one pixel, the classifier operates on 255 pixel data. Thus, the classifier provides better accuracy by removing a degree of freedom. In other words, for small translations, the classifier now considers a smaller subset of data in reaching a decision. Consequently, the more symmetries that are imposed by preprocessor 125, requires the classifier to operate on less and less data. Thus, the inventive concept enables the classifier to operate more efficiently in terms of, e.g., memory size, and training time, yet classify more patterns than in the prior art for a given-size classifier.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, the inventive concept is also applicable to other kernel-based methods such as, but not limited to, regression estimates, density estimation, etc.

What is claimed:

1. An improved method for implementing a local invariance for use in a kernel-based classifier system, the improvement comprising the step of:
    incorporating the local invariance in such a way that a resulting dimension of each feature vector is fixed and wherein that dimension is equal to the dimension of input data minus the number of degrees of freedom in the local invariance;
    wherein the input data is of dimension N and the provided data is of dimension M, where M<N.

2. Apparatus for use in a kernel-based classifier system, the apparatus comprising:
    a preprocessor, which operates on input data in such a way as to provide any local invariance in providing data to the kernel-based classifier system;
    wherein the input data is of dimension N and the provided data is of dimension M, where M<N.

3. The apparatus of claim 2 wherein the kernel-based classifier system is a support vector machine.

4. The apparatus of claim 2 wherein the provided data has an additive invariance property such that the kernel-based classifier system only has to learn a vector-based function that is independent of values of the input data when the input data is translated.

5. A method of preprocessing for use in a kernel-based classifier system, the method comprising the steps of:
    receiving input data; and
    operating on the received input data in such a way as to provide a local invariance, other than translation, scale and rotation invariance, in providing data for use by the kernel-based classifier system;
    wherein the input data is of dimension N and the provided data is of dimension M, where M<N.

6. The method of claim 5 wherein the kernel-based classifier system is a support vector machine.

7. The method of claim 5 wherein the provided data has an additive invariance property such that the kernel-based classifier system only has to learn a vector-based function that is independent of values of the input data when the input data is translated.

8. A method of preprocessing for use in a kernel-based classifier system, the method comprising the steps of:
    receiving input data; and
    operating on the received input data in such a way as to provide a local invariance, besides translation, scale and/or rotation invariance, in providing data to the kernel-based classifier system;
    wherein the input data is of dimension N and the provided data is of dimension M, where M<N.

9. The method of claim 8 wherein the kernel-based classifier system is a support vector machine.

10. A method of preprocessing for use in a kernel-based classifier system, the method comprising the steps of:
    receiving binned continuous input data; and
    operating on the received binned continuous input data in such a way as to provide at least one local invariance in providing data to the kernel-based classifier system;
    wherein the input data is of dimension N and the provided data is of dimension M, where M<N.

11. The method of claim 10 wherein the kernel-based classifier system is a support vector machine.

12. A method of preprocessing for use in a kernel-based classifier system, the method comprising the steps of:
    receiving input data; and
    operating on the received input data in such a way as to provide a number of local invariances such that at least one of the local invariances is not translation, scale and/or rotation invariance, in providing data to the kernel-based classifier system;
    wherein the input data is of dimension N and the provided data is of dimension M, where M<N.

13. The method of claim 12 wherein the kernel-based classifier system is a support vector machine.

14. Apparatus for use in a kernel-based classifier system, the apparatus comprising:
    a preprocessor, which operates on input data in such a way as to provide a set of local invariances where the set of local invariances includes a local invariance which is not translation, scale, or rotation invariance;
    wherein the input data is of dimension N and the provided data is of dimension M, where M<N.

* * * * *